Aug. 3, 1937.    E. D. PYZEL    2,089,038
CATALYTIC CONVERTER
Filed Jan. 27, 1936
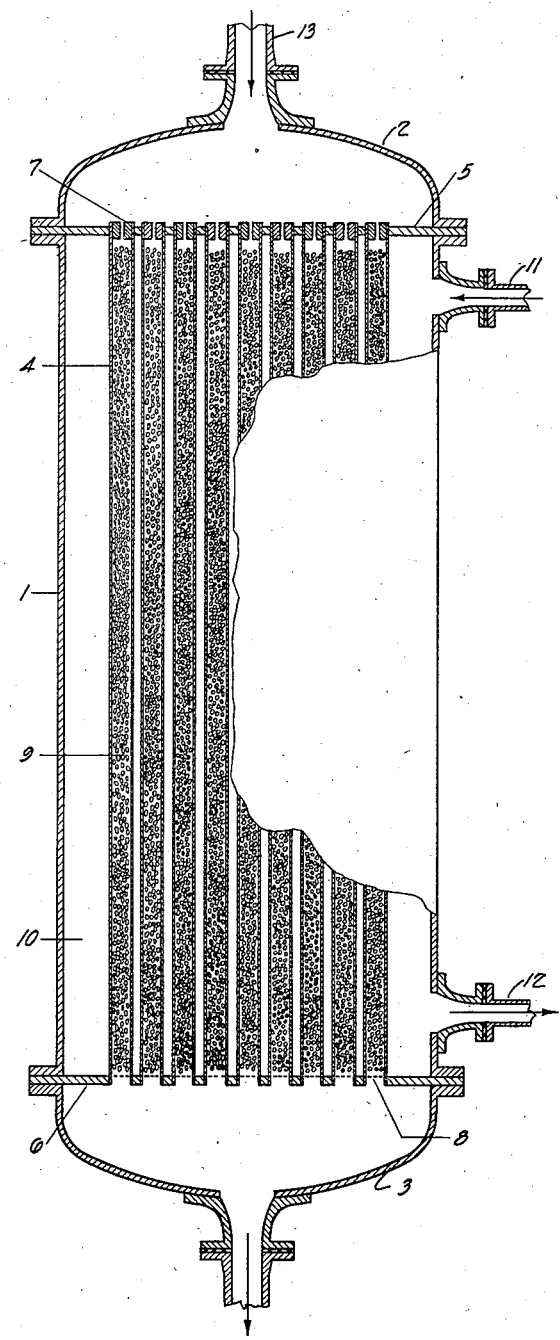
Inventor: Ewald D. Pyzel
By his Attorney: H. Birch Patented Aug. 3, 1937

2,089,038

UNITED STATES PATENT OFFICE 2,089,038

CATALYTIC CONVERTER

Ewald D. Pyzel, Pittsburg, Calif., assignor to Shell Development Company, San Francisco, Calif., a corporation of Delaware Application January 27, 1936, Serial No. 60,963

2 Claims. (Cl. 23—288)

This invention relates to catalytic converters designed to contain a solid catalyst and to effect chemical reaction between gaseous streams passed therethrough.

In particular this invention is concerned with the prevention of channeling of the gas through the solid catalyst. The catalyst is generally broken into pieces of comparatively uniform size. The particular size of the lumps of catalyst depends somewhat on the rate at which it is desired to pass the gases through the catalyst.

One disadvantage in the operation of the existing converters is the tendency of the gases to channel through the catalyst mass. Channeling is the result of the resistance to the flow of gas in one part of the catalyst mass being less than in others. As the majority of the gas will follow the channel the rest of the catalyst will not be used to the best advantage. The catalyst in the proximity of the channel will often become prematurely exhausted due to its increased activity. Furthermore as the contact between the gas and the catalyst is less the conversion is reduced.

It is therefore an object of this invention to devise a catalytic converter which will ensure an even distribution of the gas through the converter.

The further objects of my invention will be apparent to those skilled in the art from the following detailed description of a specific embodiment of my invention throughout which reference is made to the accompanying drawing which is a partial sectional elevation of a catalytic converter suitable for the synthesis of ammonia. It should be remembered that a similar converter could be used for other gas synthesis reactions.

Referring to the drawing numeral (1) represents the converter barrel having end pieces (2) and (3) the whole forming the converter shell. Centered within the converter shell are a large number of parallel tubes (4). These tubes are anchored into two circular plates (5) and (6) one at the upper end of the tubes and one at the lower end of the tubes. The plates (5) and (6) tightly fit into the converter shell. The upper end of each tube (4) is fitted with an orifice plug (7). At the lower end of each tube suitable screen (8) is placed for supporting the catalyst.

Each tube is filled with pieces of a solid catalyst (9). The space (10) between the tubes is provided for the purpose of controlling the catalytic reaction. This may be effected by means of a fluid medium circulated therethrough whereby the catalyst is maintained at the proper operating temperature. In ammonia synthesis the gases to be converted into ammonia can be passed into this area through conduit (11) out through conduit (12) and into the inlet (13) for synthesis in the tubes (4). Other variations will be apparent to those skilled in the art.

The inclusion of the orifices (7) at the end of tubes containing catalyst has the effect of equalizing the flow through the catalyst as will be explained herein. The orifices are of such size that the pressure differential required to cause the flow of a given quantity of gas therethrough in a particular time interval is considerably greater than the pressure differential required to pass the same amount of gas in the same time through the tubes (4) filled with catalyst. For example, if the difference in pressure on the two sides of the orifices was 26" of water then the pressure drop between top and bottom of the catalyst (4) should be about 6" of water although I do not limit myself to this figure. Under the above conditions it will be seen that if the resistance to flow in any particular tubes is less than in others the total pressure drop on any particular tube unit will not be greatly less than in the others. Consequently the flow of gas will not be materially increased through the tube having the lower resistance. The advantage of this arrangement will at once be apparent. The more uniform distribution of the load throughout the converter results in a more uniform temperature, longer life of the catalyst at a greater capacity of the converter as well as a longer time of contact between the gases giving a better percentage conversion.

Instead of placing the orifice plugs at the top of the tubes containing the catalyst the plugs could be located at the bottom where the effect would be the same, besides being useful for the synthesis of iso-octane or methanol and in all catalytic processes in which a gaseous stream is passed over a solid catalyst.

I claim as my invention:

1. A catalytic converter comprising a shell, division plates transversely mounted in said shell, tubes containing solid catalyst mounted in said division plates, an orifice in one end of each of said tubes, a gas inlet at one end of said converter, a gas outlet at the other end of said converter, said orifices being of such size that the back pressure created by each of said orifices exceeds the back pressure created by the catalyst in each of said tubes.

2. In a process for contacting gases with solid catalyst contained in a plurality of parallel tubes, the steps of passing gases through columns of solid catalyst in said tubes from a common source under pressure, restricting the flow of gases through each of said tubes by means of orifice plugs so that the pressure drop across said orifice plugs is substantially greater than the pressure drop due to each of said columns of catalyst.

EWALD D. PYZEL.